Dec. 1, 1970   J. L. DUDA, JR   3,543,493

HARVESTING MACHINE

Filed April 24, 1967   12 Sheets-Sheet 1

INVENTOR
JOHN L. DUDA JR.
BY Julian C. Renfro
ATTORNEY

Dec. 1, 1970  J. L. DUDA, JR  3,543,493

HARVESTING MACHINE

Filed April 24, 1967  12 Sheets-Sheet 7

INVENTOR
JOHN L. DUDA JR.
BY Julian L. Renfro
ATTORNEY

United States Patent Office 3,543,493
Patented Dec. 1, 1970

3,543,493
HARVESTING MACHINE
John L. Duda, Jr., Oviedo, Fla., assignor to A. Duda & Sons, Inc., Oviedo, Fla., a corporation of Florida
Filed Apr. 24, 1967, Ser. No. 633,044
Int. Cl. A01d 45/00
U.S. Cl. 56—327                               7 Claims

ABSTRACT OF THE DISCLOSURE

This invention relates to an improved automatic harvesting machine utilizing vertically adjustable cutoff means for severing plants from the ground, in concert with pickup means for grasping the plants as they are severed, so that they can subsequently be raised to a sufficient height for loading into an adjacent wagon. Such pickup is accomplished by the use of a belt arrangement so designed as to avoid damaging the plants, even though a brittle variety of celery is being harvested. The pickup belt arrangement is of unusual length, so that the severed plants can thereby be raised to the full height necessary for subsequent loading into the accompanying wagon, which loading can be accomplished utilizing gravitational forces and involving only a minimum of handling.

IMPROVED HARVESTING MACHINE

This invention relates to an improved machine for harvesting rows of plants from a field in a rapid, virtually automatic manner, and more particularly to a harvester that can sever plants from the ground effectively, and then proceed to load same onto an accompanying vehicle without causing breakage even though items as brittle as some varieties of celery are being harvested. This invention is a modification of my co-pending application entitled Automatic Harvesting Machine, filed Oct. 23, 1965, Ser. No. 503,222, now Pat No. 3,442,071.

In the past, a number of automatic harvesting machines had been proposed, and these have included machines with a plurality of rotatable cutting discs disposed so as to sever celery plants or the like from the ground, but these machines have not been too satisfactory, have been costly, and difficult to operate and maintain. Even more significant perhaps is the fact that these prior art machines have been unable to harvest crops such as celery in such a manner that the celery can thereafter be profitably marketed.

My above mentioned patent went a long way toward providing an automatic machine for the harvesting of crops of this nature and involved the use of vertically adjustable cutoff blades whose height above the ground can be adjusted on a moment by moment basis by the operator so that the celery stalks or other plants being harvested are not broken apart as a result of being cut too high, nor left with root structures that must be removed before the crop can be marketed.

My earlier machine utilized a pickup belt arrangement in association with each cutoff blade so that the severed plants could be immediately captured and then carried to a higher location on the machine. At the elevated location the pickup belts were designed to release the plants so that they could drop onto a first conveyor belt, and thereafter be delivered to a second conveyor belt. The latter belt was disposed at a steep angle in order to reach a height above the sides of the wagon accompanying the harvester into which wagon the crop was to be loaded. This arrangement worked quite well in a variety of soils and successfully harvested celery and other crops despite considerable variation in their height. However, when the celery was particularly brittle, the grasping by the pickup belts of the main part of this plant caused some of the limbs to shatter and break. Additionally, the second conveyor belt, because of its steepness, was preferably equipped with paddles or blades that likewise tended to shatter the limbs of brittle celery.

Accordingly, I have designed the present celery harvester so as to avoid grasping the limbs of the stalks, so as to avoid use of conveyor belts having additional lifting means thereon, and in general so as to avoid all forms of unnecessary handling. More specifically, the pickup belts used herein in connection with the severing means are arranged to grasp the uppermost part of the stalks, where the leaf portions rather than the edible limbs are disposed. The pickup belts extend for a much greater distance heightwise than in my earlier machine, so that the plants rise to a height greater than that of the sides of the wagon in which the crop is to be deposited. By virtue of this arrangement, the conveyor belt upon which the plants drop when released by the pickup belts can be horizontally disposed, and therefore need have no lifting means thereon, nor any need to deliver the celery to a second belt. However, the present machine does preferably use a second operator whose function is to operate an automatic means that is designed to cause the conveyor belt to move laterally back and forth with respect to the harvester as necessary to achieve an even loading of all portions of the wagon. Further steps to prevent damage to brittle celery typically entails the use of a wagon with a descending floor such that the height the celery must drop into the wagon is minimized.

As is therefore to be seen, I have combined the effective cutoff arrangement taught in my earlier case with a crop handling arrangement of such a design that the most brittle varieties of celery are not damaged even when harvested in a very rapid manner.

A primary object of this invention is therefore to provide an improved automatic harvesting machine that accomplishes the effective cutting, pickup and loading of plants such as celery or the like, with pickup being accomplished in such a manner that breakage of the limbs of celery plants is avoided, and all handling of the plant minimized.

These and other objects, features and advantages will be more apparent from a study of the enclosed drawings in which:

FIGS. 18A and 18B are fragmentary perspective views of portions of the device shown in FIG. 17;

Figures 1, 1A:
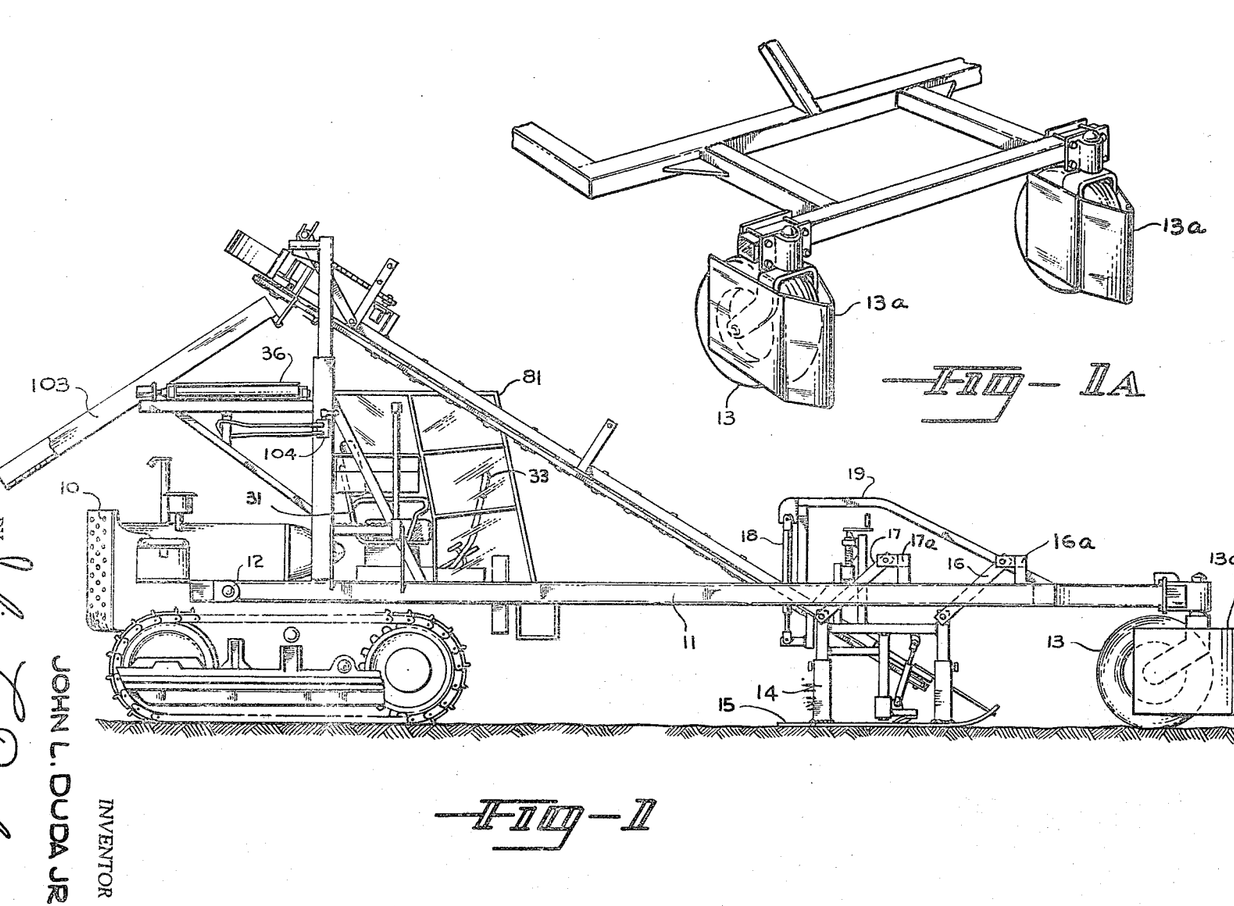
FIG. 1 is a side-elevational view of my improved automatic harvesting machine.
FIG. 1A is a fragmentary perspective view illustrating a preferred front wheel arrangement.

Turning to FIG. 1 it will be seen that my improved harvester principally comprises a tractor 10 provided with an elongated frame 11 that extends for a substantial distance in the direction of travel with respect to the tractor. As will be noted in this figure as well as related FIG. 2, the frame 11 is pinned to the tractor at opposite points 12 so that a degree of relative rotation of the frame 11 can take place with respect to the tractor.

A pair of castered wheels 13 are provided at the front end of frame 11, which wheels form a support for the front end of the frame both while the harvester is in use in the field, as well as when it is traveling over a roadway. The wheels may be provided with wheel covers 13a as shown in FIG. 1A. As will be noted in FIG. 2, the wheels 13 may be mounted on a forward portion of the frame 11 and spaced so as to straddle the rows of plants that are being harvested. Typically the rows are planted 24" apart, with the wheels 13 and the treads of the tractor arranged to straddle two rows at a time. However, this arrangement may of course be varied if such be desirable.

Figure 2:
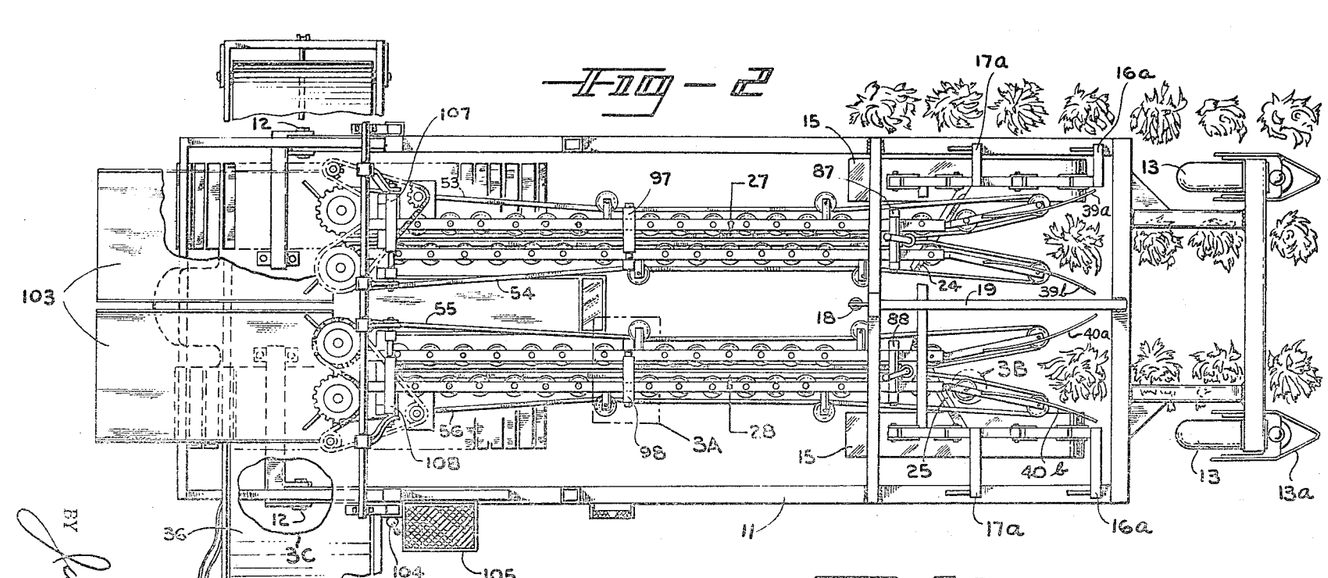
FIG. 2 is a plan view related to FIG. 1, showing the manner in which this machine proceeds along rows of plants such as celery and accomplishes the severing of same from the ground as well as the effective pickup thereof.
Figures 3A, 3B, 3C:
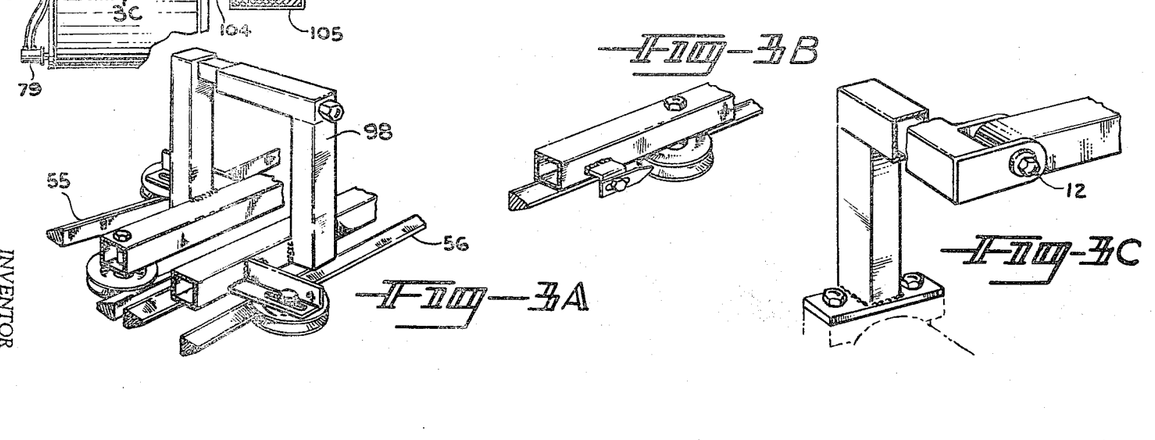
FIGS. 3A, 3B and 3C represent enlarged fragmentary views illustrating certain portions of the machine depicted in FIG. 2.

As will also be apparent from FIG. 2, may harvesting machine is otherwise constructed in conformity with a given spacing of the plants, which includes the pickup belt arrangements 27 and 28. FIGS. 3A throu 3C reveal various details associated with the pickup belts, whereas FIG. 4 reveals that pickup belt arrangement 27 utilizes belts 53 and 54, and that pickup belt arrangement 28 utilizes belts 55 and 56, which belts operate on numerous small pulleys mounted along the underside of the structural members of the arrangement. This figure also reveals the association of cutoff blades 24 and 25 with pickup belt arrangements 27 and 28, respectively, and other facets of the invention discussed hereinafter.

Figures 5, 6:
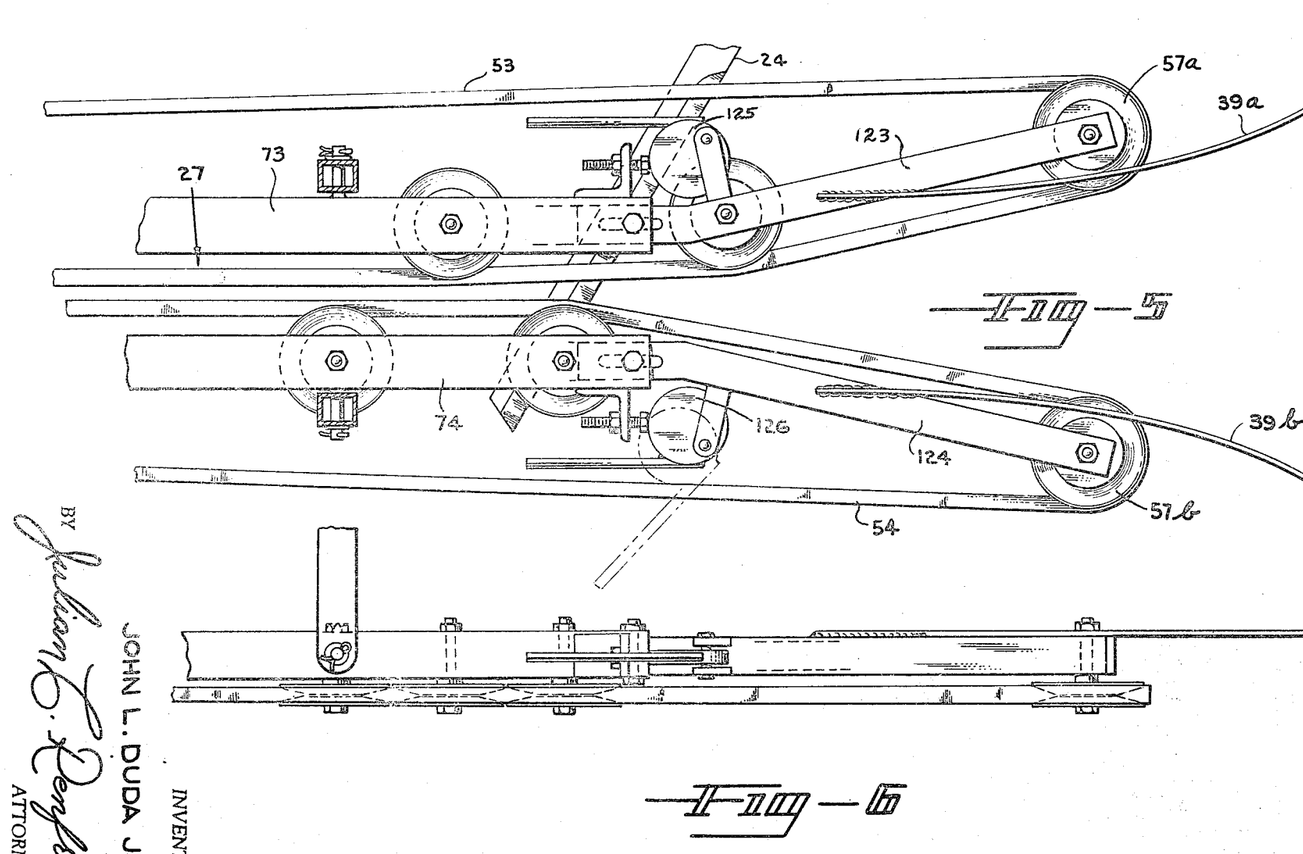
FIG. 5 is a plan view to an enlarged scale in which the relationship of a cutoff blade to the entrance of its perspective pickup belt assembly is revealed in detail.
FIG. 6 is a side elevational view closely related to the showing of FIG. 5.

Referring back to FIG. 2, it will be noted that guard members 39a and 39b form an entrance for plants to the pickup belt arrangement 27, whereas guard members 40a and 40b form an entrance to the pickup belt arrangement 28. FIGS. 5 and 6 reveal other details of the guard members and the belt relationships.

Figure 7:
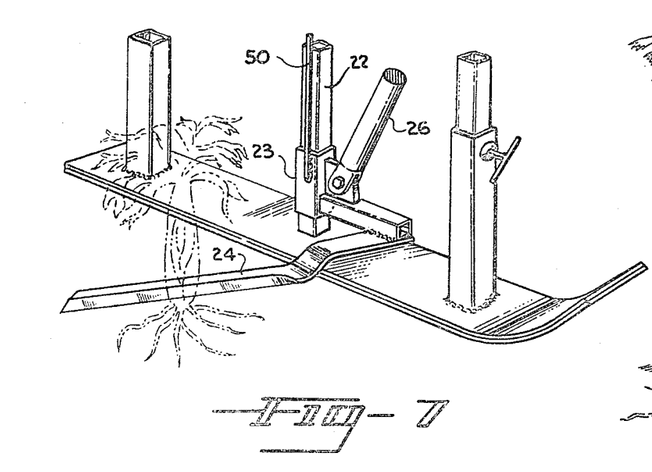
FIG. 7 is a fragmentary perspective view showing the relationship of a cutoff blade to an uncut plant.

The cutoff blades 24 and 25 are positioned in such a relationship to the respective pickup belt arrangements 27 and 28 that at such time as a pair of pickup belts have engaged and grasped the leaves of a given celery plant, the associated blade accomplishes the severing of the plant from the ground. Blade 24 is shown in greater detail in FIGS. 7, 9 and 10, and the relationship of this blade to the pickup belts 53 and 54 associated with pickup arrangement 27 is best revealed in FIGS. 5 and 8.

As in my previous invention, the cutoff blades 24 and 25 are preferably mounted upon a blade-mounting framework 14, which is equipped on its underside with a pair of runners or skis 15 spaced substantially identically to wheels 13. The arrangement is such that the framework 14 is relatively independent heightwise of the frame 11 during the harvesting operation, being principally supported at such times by the runners 15, which of course conform to the ground contours so as to give a highly desirable type of support for blades 24 and 25.

Figure 4:
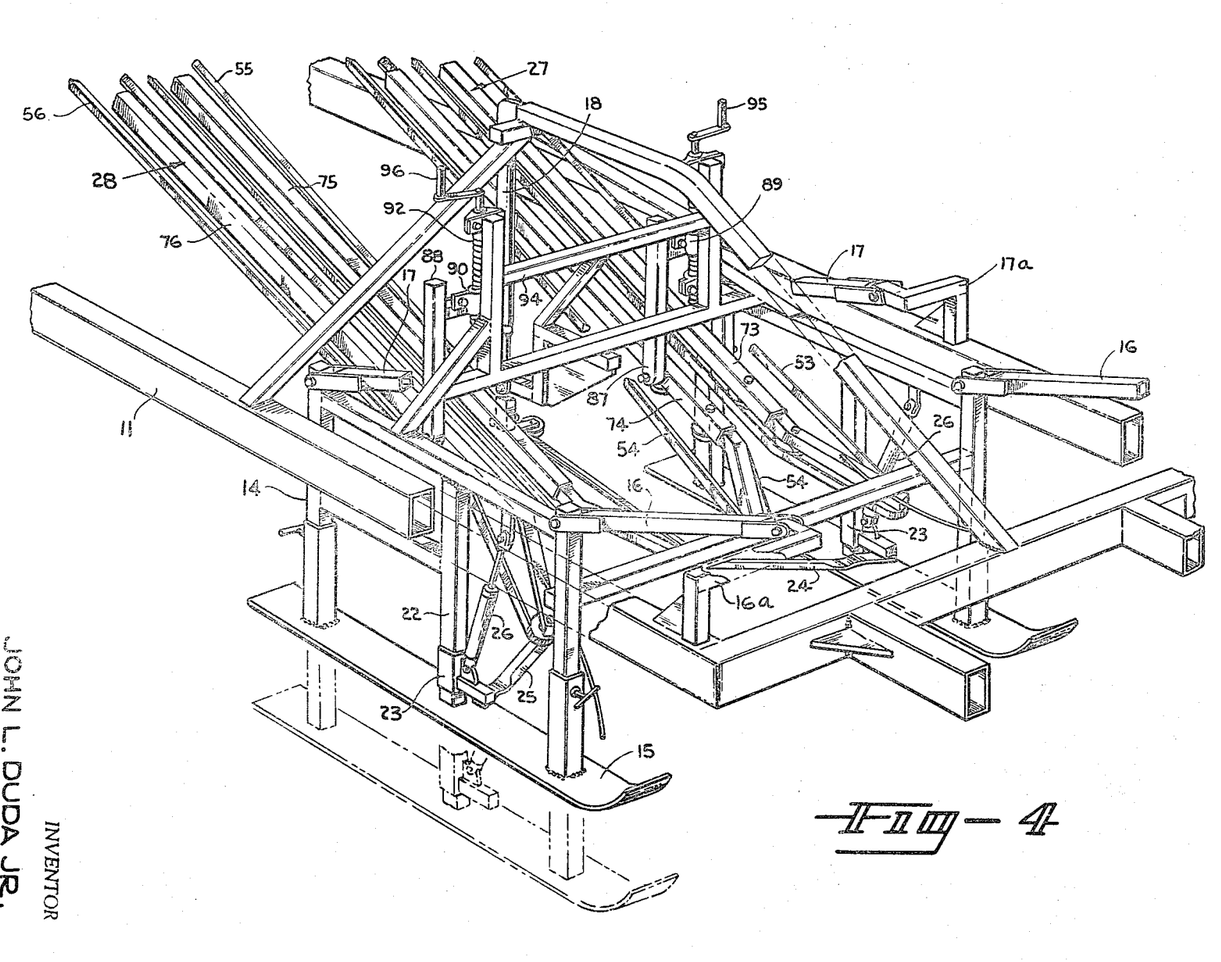
FIG. 4 is a perspective view of the front portion of my improved harvester, illustrating the disposition of the cutoff blades, their relationship to the pickup belts arranged to grasp the severed plants before they fall to the ground, and the use of a ski-equipped framework from which the cutoff blades and pickup belt assemblies are supported.

More precisely, the framework 14 is connected to frame 11 by a plurality of bars that in effect constitute a parallelogram linkage. As seen in FIGS. 1 and 4, and in greater detail in FIGS. 11 and 12, forward and rear bars 16 and 17, respectively, are connected at their upper ends to mounting arms 16a and 17a secured to frame 11. The lower ends of these bars are connected to upper corners of framework 14, and assure that the top of framework 14 remains basically parallel with the main frame 11 of the harvester. As revealed in FIG. 4, for example, a bar 16 and a bar 17 are disposed on both left and right sides of the device so as to assure proper connective relationship for each of the upper four corners of the framework 14, while at the same time allowing sufficient flexibility so that the framework 14, when supported by the skis 15, can closely follow the ground contour.

It will be noted that a vertical member 22, such as of square tubing, is mounted at an approximate mid-point on each side of the framework 14, and upon each member 22 a collar-like member 23 is disposed in vertically slidable relation. As will be noted in FIG. 4, upon such collar members cutoff blades 24 and 25 are rigidly mounted, such as by welding. Additional details may be more apparent in FIGS. 7 thru 10. Quite significantly, the blades 24 and 25 are separately and selectively adjustable in the heightwise direction, as will now be discussed.

Figure 9:
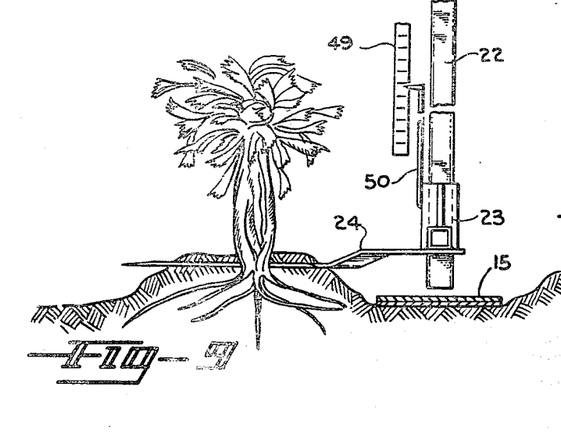
FIG. 9 is a fragmentary view illustrating the relationship of a cutoff blade to the ski by which it is supported, with the blade being in a raised position in order to conform to the height of the roots of a plant being cut.
Figure 10:
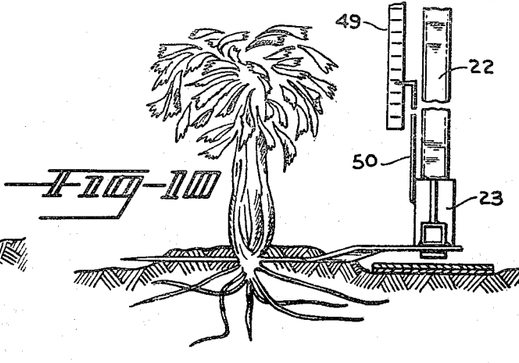
FIG. 10 is a view related to FIG. 9 but showing the blade in a lowered position.
Figure 11:
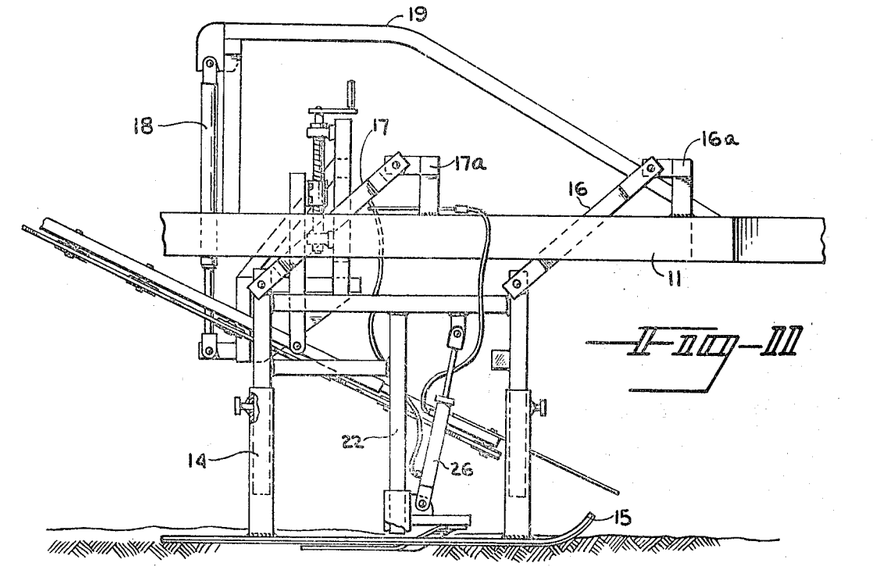
FIG. 11 is a fragmentary view revealing the relationship of the framework upon which the cutoff blades are adjustably mounted, to the main frame of the harvester.
Figure 12:
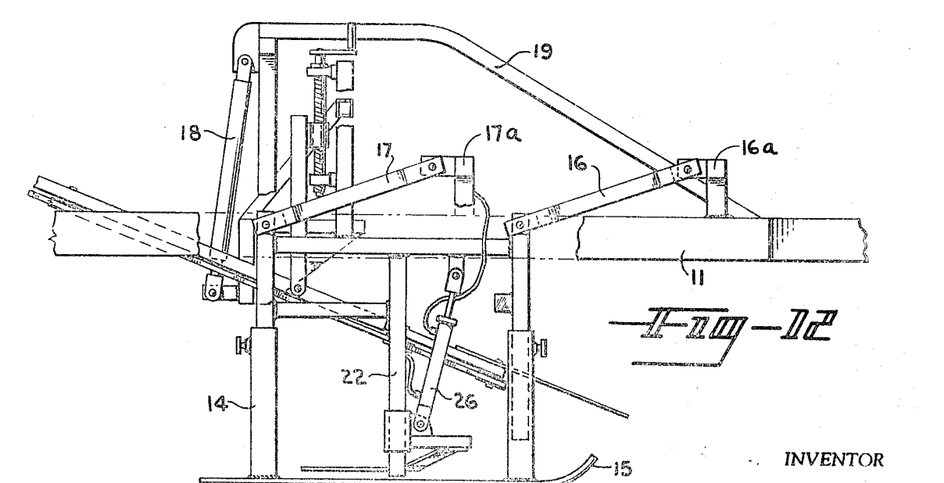
FIG. 12 is a view related to FIG. 11, but revealing the framework in a raised, non-functional position.

An actuator 26, such as a hydraulic actuator, is connected at an upper portion on each side of framework 14, and extends downwardly to connect with an appropriate portion of each collar member 23, as will be noted from FIGS. 4, 11 and 12. When an actuator 26 is extended to its full length as shown in FIG. 11, its blade is in its lowermost position, as shown in latter figure as well as in FIG. 10. However, when the actuator 26 has been operated in the direction such as to shorten its length, the blade is raised with respect to its runner 15, as shown in FIGS. 9 and 12. This construction is of course the same on both sides of framework 14, and this was an important facet of my earlier harvester invention.

Separate actuators for the cutoff blades 24 and 25 and separate controls for these actuators enable the operator-driver to selectively manipulate these blades heightwise on a moment-by-moment basis so as to achieve at all times proper contact with the celery stalks being cut.

Reference to FIGS. 2 and 4 reveals that the cutoff blades 24 and 25 are each disposed in sweptback relation, with the angles these blades bear to the longitudinal axis of the harvester preferably being identical to each other or nearly so. As will be discussed hereinafter, the relationships these blades bear to the pickup belt arrangements 27 and 28 are critical and must be carefully adjusted if the relatedly-moving belts of each of the pickup belt arrangements are to properly grasp the leaf portion of the celery just as the stalks are severed from the ground.

Figures 16A, 16B, 17:
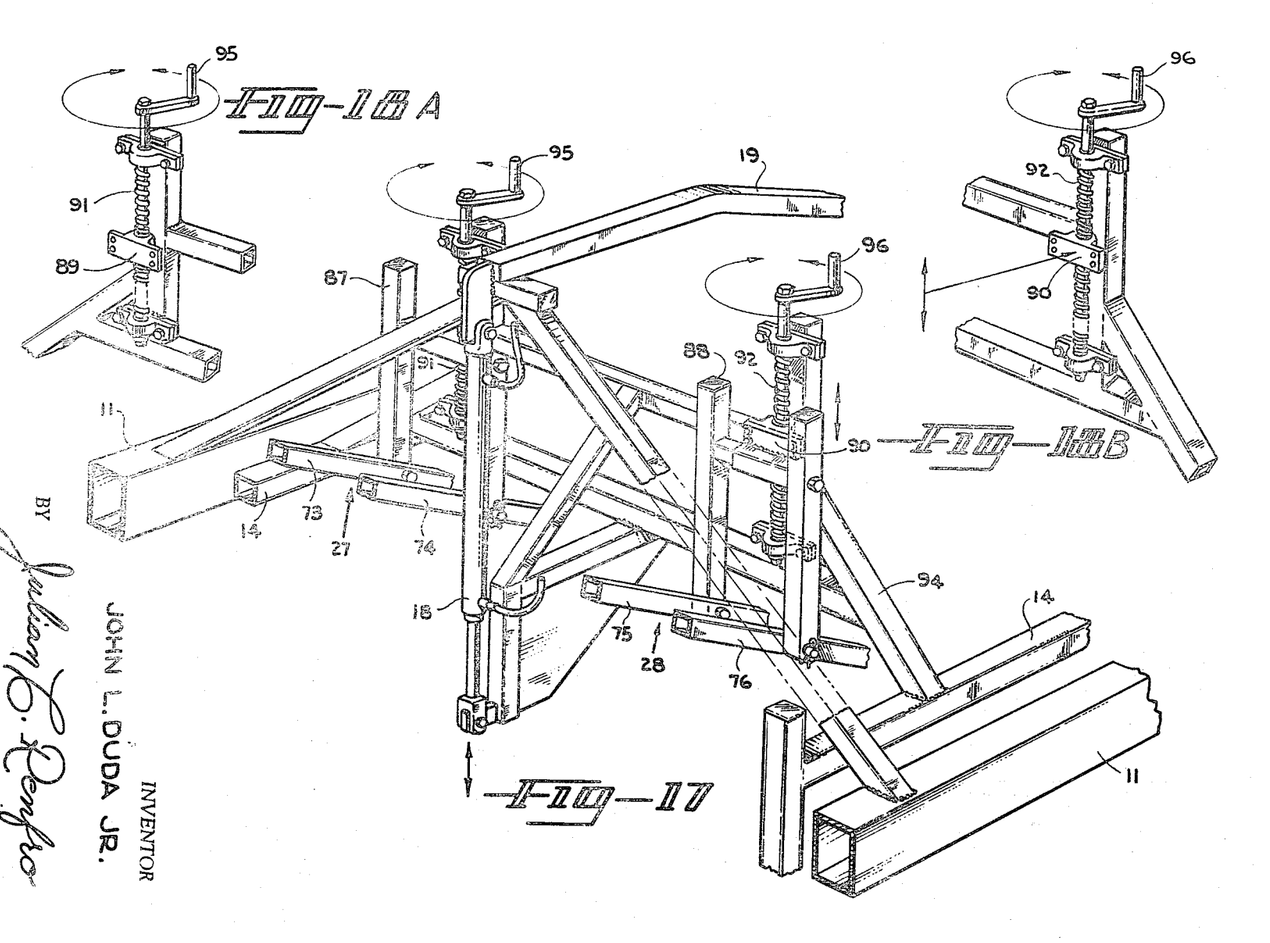
FIG. 17 is a fragmentary perspective view of the height adjustment means for the pickup belt assemblies.

FIGS. 1, 4, and 17 reveal the use of an actuator 18, such as a hydraulic actuator, that is employed for controlling the positional relationship of framework 14 with respect to frame 11. Actuator support structure 19 is constructed upon frame 11 so as to assure a rigid mounting point for the upper end of actuator 18. Therefore, when the latter device is operated so as to decrease its length, by virtue of attachment of the lower end of the actuator to an upper central portion of the rear part of framework 14, the entire weight of the framework 14 is transferred to the frame 11, and of course taken off the runners 15. This operation is only resorted to at such times as the harvester is to be moved from one field to another or over roadways, for during harvesting operations, the weight of framework 14 is normally and desirably borne upon runners 15.

The operator-driver sits in cab 81 in a seat 31 facing the direction of travel of the harvester, so that he can clearly observe the stalks of celery being severed by each of the blades 24 and 25. As to be seen in FIG. 13, customary tractor operating levers 32 and 33 are provided for the operator's use in making corrective movements to the left or right during the harvesting operation, and hydraulic controls 34 and 35 are disposed nearby and positioned in such a manner that the operator can easily maintain his hnad on these controls during the operation. By appropriate manipulation of these controls, the blades 24 and/or 25 may be appropriately moved on a moment by moment basis so as to bring about proper celery severing operations. A slight gage arrangement constituted by gage 49 mounted on framework 14 and pointer 50 mounted on member 23 are provided on each side of the machine to enable the relative height of each cutoff blade to be quickly ascertained; see FIGS. 9 and 10.

Figures 13, 14:
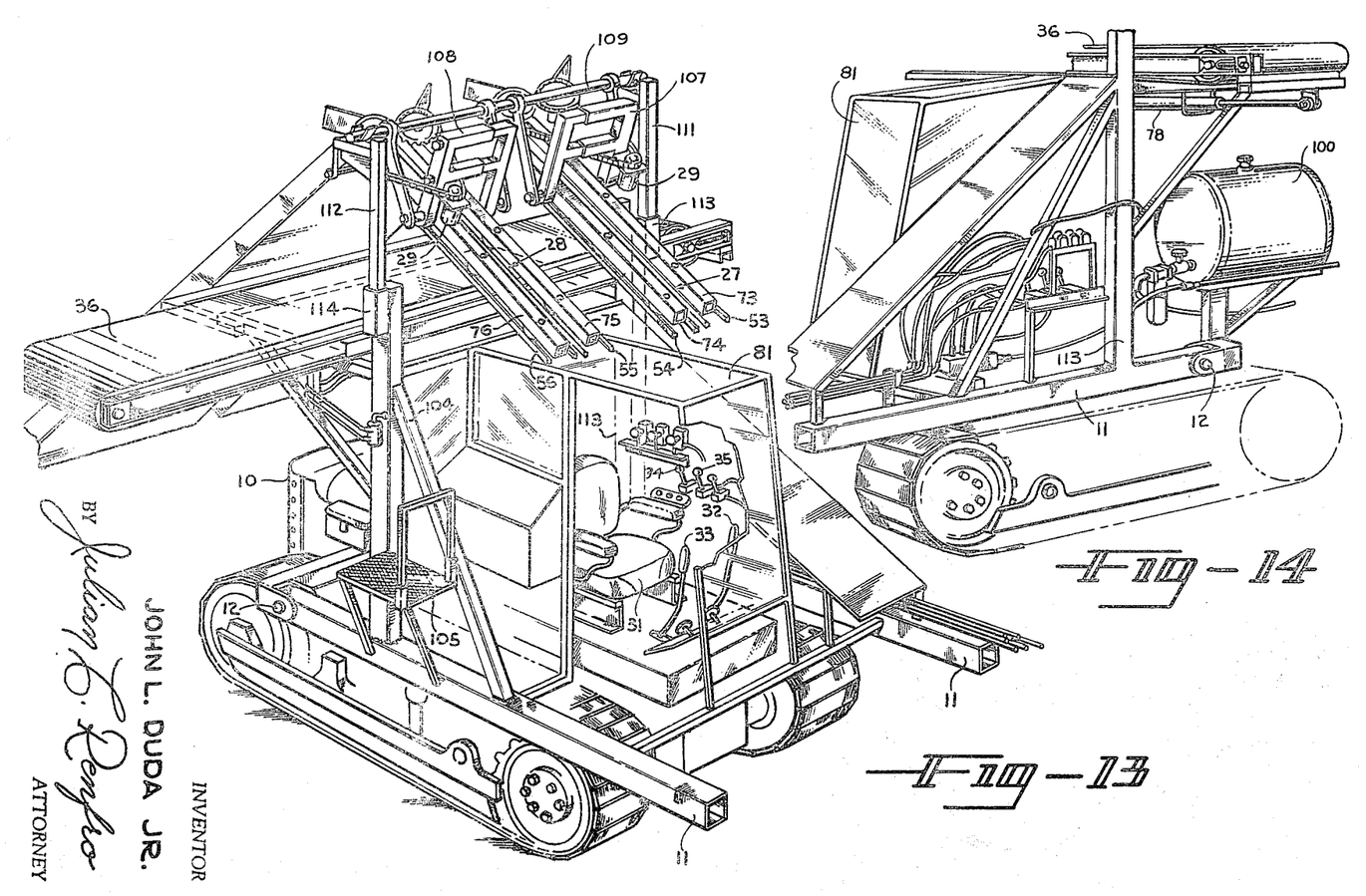
FIG. 13 is a perspective view with the front portion of the harvester removed so as to reveal the arrangement of controls manipulated by the operator in order to bring about the proper harvesting operation.
FIG. 14 is a fragmentary perspective view illustrating the opposite side of a harvesting machine, which includes reservoir or tank for hydraulic fluid.

The other small control handle visible in FIG. 13 is used for raising and lowering the framework 14, whereas the various control buttons control the operation of conveyor belt 36, the operation of the pickup belt assemblies, and the like. These controls will be discussed in connection with FIG. 24.

Although I have shown the actuators on my harvester to be hydraulic devices, it is to be understood that such is not required, for electric screw jacks, electric motors or some other alternative devices could be utilized if desired. I prefer the use of hydraulic actuators and hydraulic motors because of their ruggedness and because of the availability of high pressure hydraulic fluid from an appropriate pump on the tractor 10.

As previously mentioned, by the appropriate manipulation of actuator 18, the weight of framework 14 may either be transferred to frame 11, or alternatively allowed to remain on skis or runners 15. In order that the framework 14 can move freely with respect to the frame 11 so the skis 15 conform to the contours alongside the rows of celery plants, I utilize a hydraulic control 37 that has a "float" position thereon. Such a control for example is made by the Gressen Company of Minneapolis, Model Nunmber 2711. This four position hydraulic control valve has up, neutral, down, and float positions, and when in the "float" position, the control allows the hydraulic fluid in the ends of the actuator 18 to freely come and go from the actuator, in this manner allowing the framework 14 to undertake fore and aft tilting movements as may be necessary. As a separate matter, I deliberately utilize oversize bolt holes in the bars 16 and 17 at the locations where the bolts from framework 14 are received, so that the framework 14 can undertake left and right tilting movements as well, as the ground contours may dictate.

It is a fact that in certain celery fields, some of the rows of celery plants are alongside "roadways" over which various vehicles pass, such as the vehicles utilized for fertilizing the fields. Therefore, there are instances in which the runner 15 on one side of the framework 14 is operating in a furrow that is significantly higher or lower than that of the other runner. In order to avoid a situation in which the framework 14 is continuously tilted to a marked degree, I provide for allowing the runner on the low side to be dropped an appropriate amount with respect to the other. This is accomplished as shown in FIGS. 4, 7, 11 and 12 by providing a hand operated tightening bolt-and-collar arrangement, which enables the degree of vertical telescoping between the upper and lower members of framework 14 to be controlled. It should be noted, however, that this does not affect the positioning of the cutoff blades, for they are mounted upon structural members 22 that are secured only at their upper ends to the framework 14.

As previously mentioned, the pickup belt assemblies shown generally in FIG. 2 and in more detail in FIGS. 4, 8, 13 and 15 are designed to grasp the leaf portions of the stalks of celery as the celery is cut from the ground by the respective cutoff blades 24 and 25. That this goal may be accomplished, the relative position between a given cut off blade and its respective pick-up belt is such that a central portion of the cutting edge of the blade coincides with the portion of pick-up belt arrangement wherein the forward portions of belts come together so as to be available to grasp the leaf portion of the stalks of celery. Note in FIG. 5 the positioning of blade 24 with respect to the belts 53 and 54. The fore and aft relationship between each cutoff blade and its respective pickup belts is established at the factory, and in service rarely needs adjustment. However, from the heightwise standpoint various adjustments may be made, such as the changes in the blade height with respect to the skis shown in FIGS. 9 and 10, and the changes that may be made in the height of the front portion of pickup belt assemblies 27 and 28 brought about by turning the cranks 95 and 96 provided for this purpose, which are illustrated in FIGS. 4 and 17.

Referring to FIGS. 4 and 13 it will be noted that the pickup belt assembly 27 is constituted by sloping longitudinal members 73 and 74, and pickup belt assembly 28 constituted by sloping longitudinal members 75 and 76. As will be noted in FIGS. 4 and 17, adjustable-width truss type members 87 and 88 are provided for supporting the forward portions of pickup assemblies 27 and 28, respectively, with central portions of these truss members being supported from brackets 89 and 90 threadably disposed on screws 91 and 92; note FIGS. 18A and 18B. These screws are rotatably supported upon vertical framework 94 that is secured across the top of the framework 14, extending from left to right. As screw 91 or 92 is turned by its respective crank 95 or 96, the bracket 89 or 90, as the case may be, is moved vertically so as to bring about a heightwise movement of the front of the respective pickup belt assembly, thus making adjustment for crops of differing heights.

Because vertical framework 94 is supported from framework 14, the forward portions of the pickup belt assemblies 27 and 28 move upwardly or downwardly in concert with the movements of their respective sides of the framework 14 during the operation of the harvester, thus assuring proper relationships of the front portions of the pickup belt assemblies with the celery tops. As previously explained, although the vertical positions of cutoff blades 24 and 25 may be adjusted on a moment-by-moment basis, these blades also normally move with their respective sides of the framework 14, thus preserving a desirable relationship between each cutoff blade and its respective pickup belt assembly at all times as the framework 14 slides over the ground on its skis 15.

Figure 8:
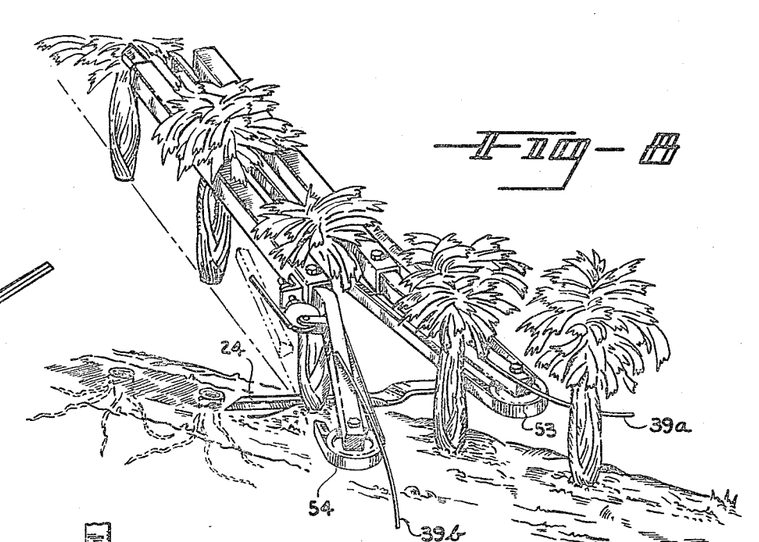
FIG. 8 is a view similar to FIG. 7 but illustrating in detail the function of the pickup belt assembly that is used in concert with a cutoff blade.
Figures 15, 16:
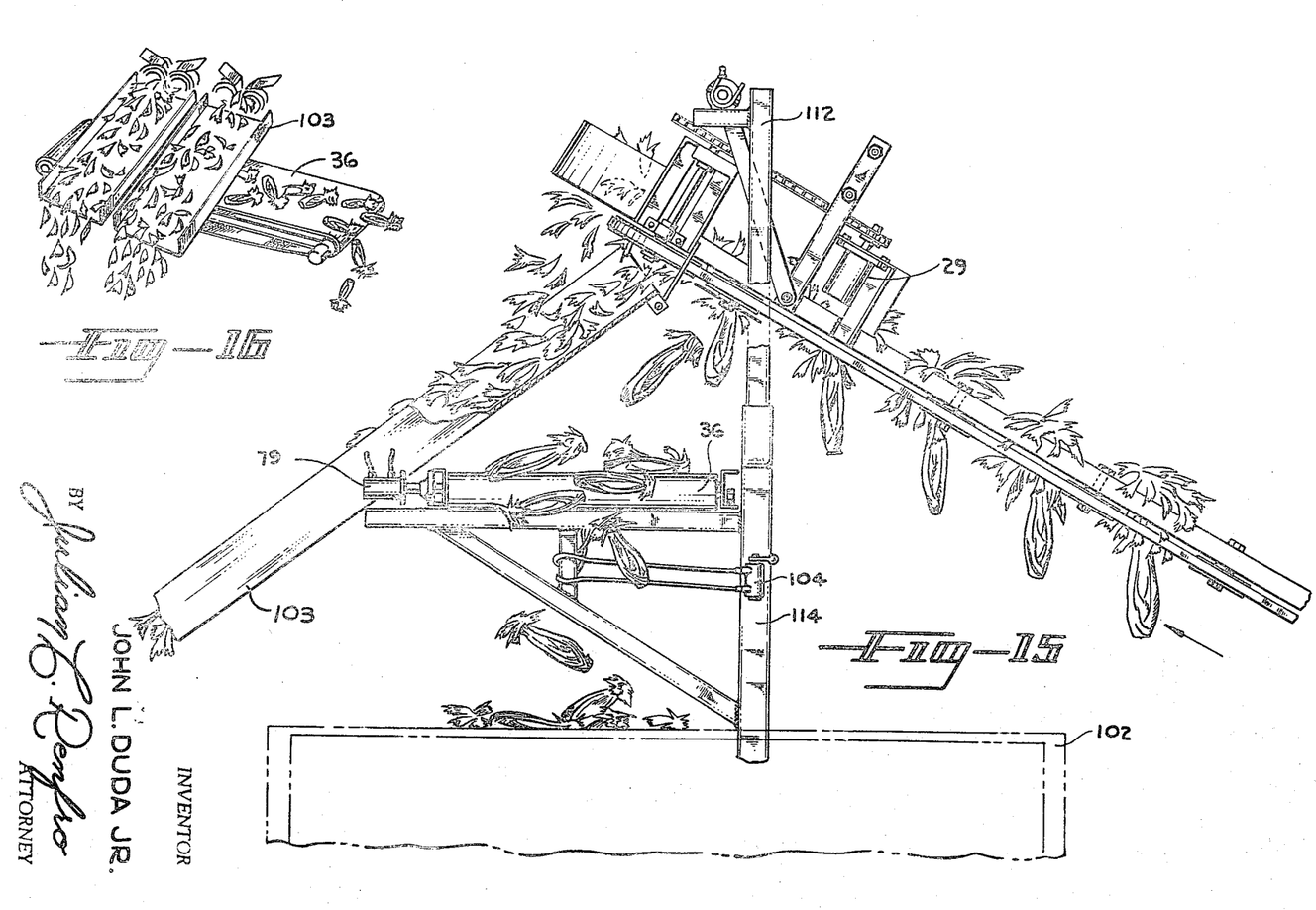
FIG. 15 is a fragmentary side elevational view to a larger scale revealing successive positions of celery being raised by a pickup belt arrangement, the topping by rotary blades so as to cause the celery plants to drop onto the conveyor belt, and the subsequent falling of the plants into the wagon or trailer, with the severed tops falling to the ground.
FIG. 16 is a perspective view to a comparatively small scale revealing the severed plants falling off the end of the conveyor belt and the tops falling down their respective chutes.

When a celery crop standing higher or lower is thereafter encountered, it should now be understood that it is a simple matter to turn cranks 95 and 96 so as to bring about the desired condition in which the belts of the pickup belt assemblies grasp in an effective manner the leaves of the celery being cut, such being shown in FIGS. 8 and 15.

Figure 21B:
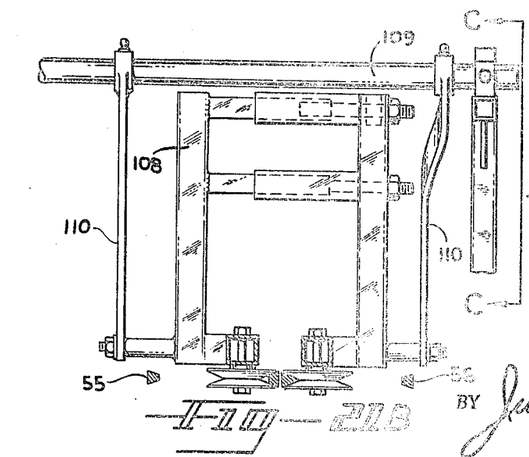
FIG. 21B is a fragmentary view of the support means for the upper end of a pickup belt assembly.
Figure 21C:
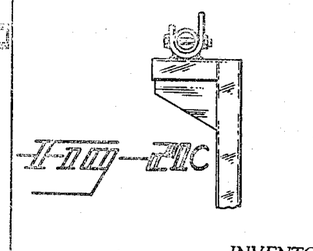
FIG. 21C is a fragmentary view related to FIG. 21B and showing certain details of the support means.

In order to enable movements of the pickup belt assemblies to be made without binding taking place, I prefer to suspend the upper ends of the pickup belt assemblies by means of adjustable width truss type members 107 and 108, shown in FIG. 13. These latter members are supported from bar or pipe 109 by means of a plurality of arms 110, which appear in FIGS. 13 and 21B. The ends of pipe 109 are supported by vertical members 111 and 112, which are in turn supported by structural members 113 and 114 mounted on the rear of frame 11.

As will be noted from FIGS. 1 and 2 in particular, the pickup belt arrangements 27 and 28 rise much higher than in my earlier harvester inventon, and in the present instance extend above the cab portion 81, and terminate above the conveyor belt 36. This greater length of the pickup belt arrangements makes possible the lifting of the celery plants to the full height required for subsequent loading, this being accomplished with a minimum of handling. This is to say, the longitudinal members 73–76 extend to a sufficient height that thereafter gravity forces are principally involved in the procedure of loading celery into the accompanying wagon 102.

Figures 19, 20, 21A:
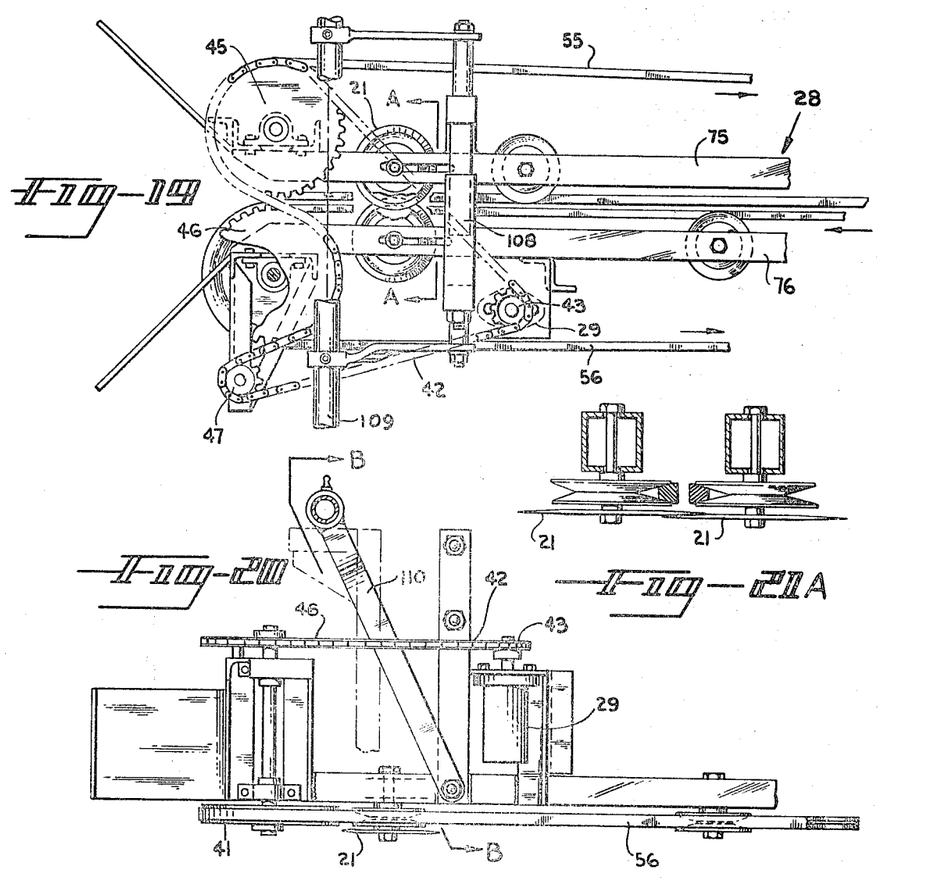
FIG. 19 is a plan view of the upper or drive portion of one of the pickup belt arrangements, depicting the rotary topping blades as well as the chain drive arrangement for driving the pickup belts.
FIG. 20 is a side elevational view related to FIG. 19 and showing in greater deail the drive motor arrangement associated with the pickup belts.
FIG. 21A is an enlarged fragmentary view of the topping blade details.

Referring to FIGS. 19 and 20, it will be noted that a motor 29, preferably a hydraulic motor, is utilized for driving an endless chain arrangement 42. FIG. 13 reveals that two of such motors are utilized. The chain 42 extends around sprocket 43 mounted on the shaft of motor 29, as well as around large gears 45 and 46, that are arranged to rotate in opposite directions and to drive the belts 55 and 56; note in FIG. 20 that gear 46 drives pulley 41 that directly drives belt 56. Latter pulley of course forms the upper terminus of the pickup belt 56 and causes its movement along the array of pulleys shown in FIG. 2 and related figures. Because of the arrangement of chain 42, gear 45 turns in the opposite direction and powers a pulley that drives belt 55, with this over-all arrangement being such that the two pickup belts when operating travel in virtual synchronism along the inclined path of travel of the celery. It is of course desirable for the belts to travel substantially together, for otherwise some twisting of the celery might well occur. Gear 47 is provided for adjusting the tension in chain 42.

FIGS. 2 and 13 reveal that both pickup belt assemblies use a driving arrangement of the type shown in detail in FIGS. 19 and 20.

The pickup belts 53 through 56 are disposed below the longitudinal structural members 73 through 76 so as to avoid unnecessary contact between these members and the celery being raised, and to simplify the pickup relationship. As seen in FIGS. 1, 2, and 15, the numerous small pulleys over which the belts pass are mounted on the underside of the members 73 through 76.

Each pair of pickup belts should be arranged to operate at a speed rather closely approximating the speed of a harvester over the ground. If the belt speed is virtually the same as the ground speed, there will be little likelihood of the tearing of the plants, or the dropping of same during the severing operation.

It will be noted from several figures of the drawing that the many small pulleys mounted on the underside of the longitudinal members are not spring-mounted as in my earlier harvester invention, but rather are bolted rigidly yet rotatively to these members. As will be noted, the positions of the pulleys are deliberately staggered in the present invention, for this manner the possible jamming of the leaf portion of a large stalk of celery between two adjacent pulleys is prevented. In other words, the celery plants being transported by the pickup belt arrangements move around a pulley on the right, then around a pulley on the left, then around a pulley on the right, and so forth, without any reasonable likelihood of jamming taking place. The front truss members 87, 88, the intermediate truss members 97, 98, and the upper truss members 107, 108, are of adjustable width so that the belts associated with the pickup belt arrangements may be moved together or apart as may be necessary to compensate for varying densities of leaf structures. Also, the tension in the pickup belts may be varied as shown in FIG. 5 by the use of cam arrangements. As will be apparent, the distance the forward members 123 and 124 extend beyond the longitudinal members 73 and 74 can be controlled by movements of cams 125 and 126, after which the forward members are firmly bolted into position.

FIG. 19 as well as related FIGS. 20 and 21A reveal the use of a pair of cutoff discs 21 near the top of pickup belt assembly 28. These discs rotate at the speed of the respective pulleys upon which they are mounted, and bring about the severing of the main portion of the celery stalk from the leaf portion as shown in FIG. 15, thus allowing the wanted portions of the celery stalks to fall onto the conveyor belt 36 as shown in latter figure. The cutting edges of the discs should overlap somewhat, as shown in FIG. 21A, and may if desired have serrated edges.

Figures 22, 23:
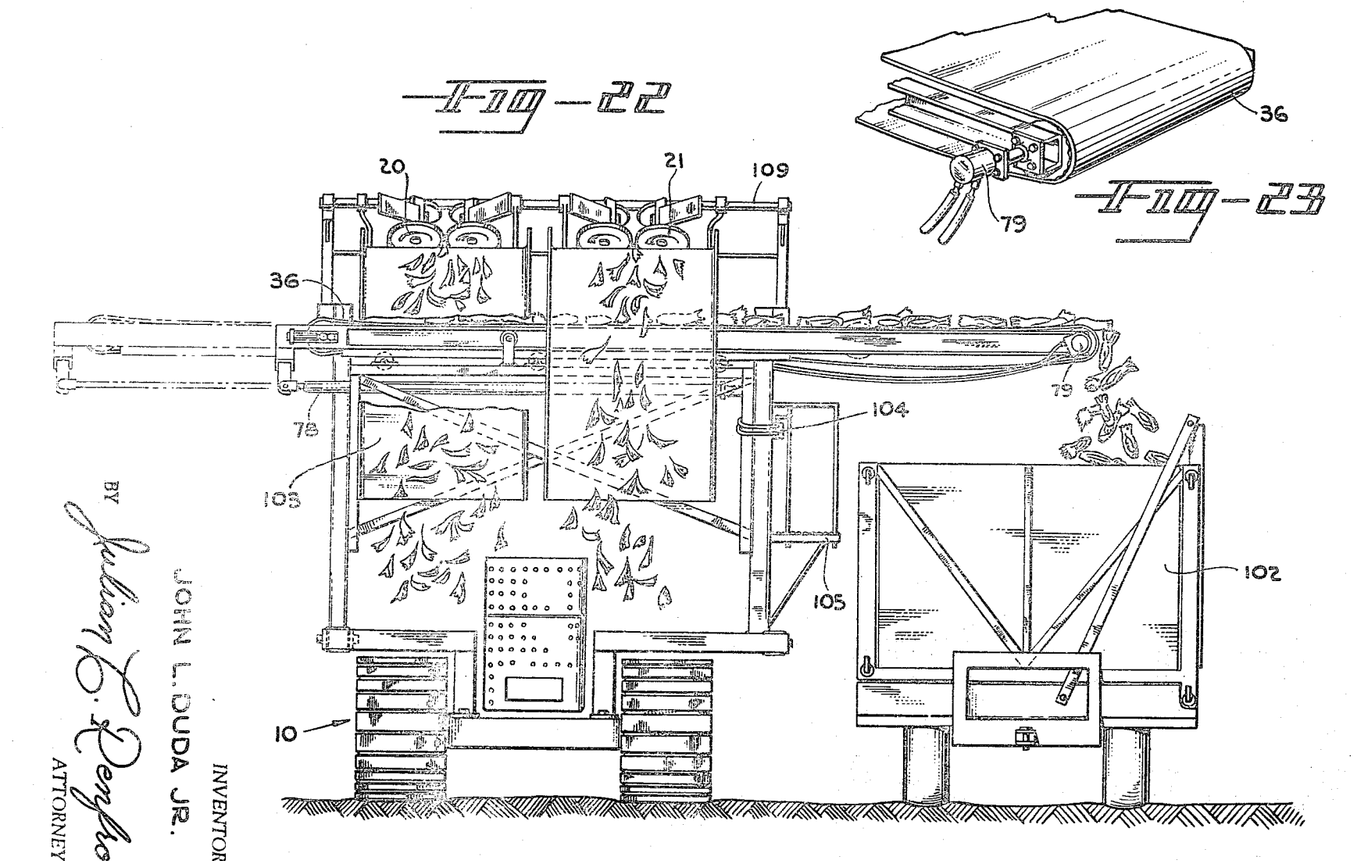
FIG. 22 is a rear elevational view of my novel harvester in operation.
FIG. 23 is a fragmentary perspective view of the drive means for the conveyor belt.

The conveyor belt 36 is driven by motor 79 in such a direction that it causes the cut celery stalks to travel toward the bottom of the page as viewed in FIG. 2, and drop into the wagon 102 in the manner indicated in FIGS. 15 and 22. The leaf portions upon being released at the upper end of the pickup belts, are allowed to fall into chutes 103 from which they may be allowed to fall on the ground as shown in FIGS. 15, 16, and 22.

It is desirable that the wagon 102 be loaded evenly, and to that end I provide for the conveyor belt 36 as well as its associated driving mechanism to traverse, while it is operating, back and forth between the positions indicated by the use of dashed lines and solid lines in FIG. 22. This traversing action is in addition to movement of the belt about its pulleys, and is made possible by actuator 78 shown in FIGS. 14 and 22, the control 104 for which is disposed on the right hand side of the harvester, as illustrated in FIGS. 1, 2, 13, 15 and 22. A stand 105 is provided on the side of the harvester nearest the wagon 102, with the height of this stand being sufficient that the man concerned with the loading operation can see into the wagon, and position the moving conveyor belt assembly in such a manner that the wagon will be loaded evenly in a left and right sense. He can also signal commands to the driver of the tractor that pulls the wagon, or wagons as the case may be, so as to bring about the necessary slowing down or speeding up of the wagons so as to make possible an even loading in a fore and aft sense. The wagon 102 is preferably of the type having a descending floor, as taught in my Pat. No. 3,408,108, inasmuch as that type of wagon minimizes the possibility of damage to the celery.

Figure 24:
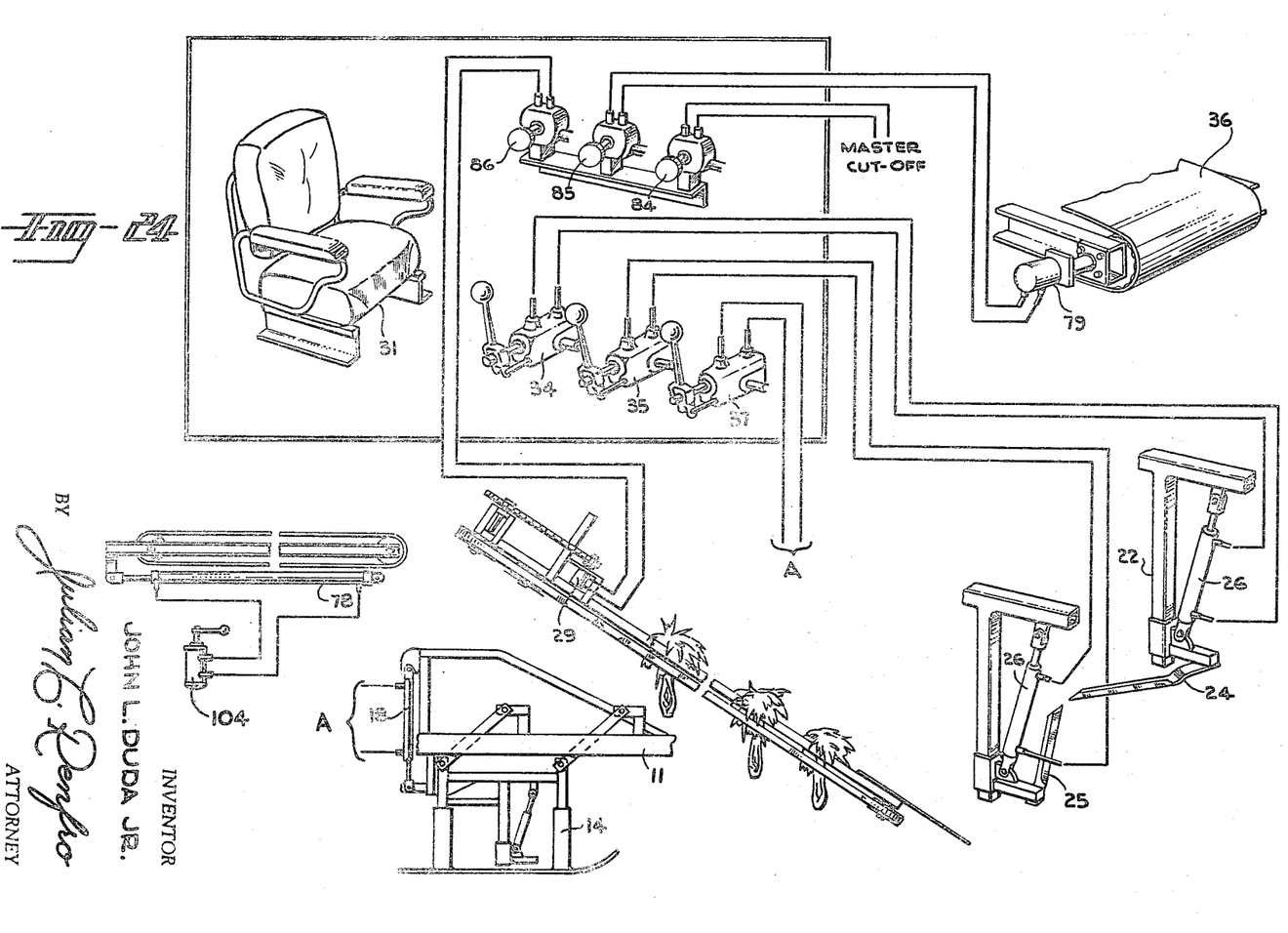
FIG. 24 is a schematic view of the control arrangement utilized in connection with each actuator or motor of the harvester.

Turning to FIG. 24, it is to be noted that the control relationships are set forth schematically. The operator seated in chair 31 has available within the easy grasp of his left hand, the control handles associated with control devices, this detail also appearing in FIG. 13. Adjacent to and somewhat above these handles are three control buttons 84, 85 and 86. Each of these devices is supplied with high pressure fluid from a hydraulic pump mounted on the tractor and driven by the engine of the tractor.

As will be noted from FIG. 24, control device 37 is operatively connected to actuator 18, so that by movement of the handle in one direction, the framework 14 can be lifted out of contact with the ground. As previously mentioned, this particular device has a "float" position that enables the framework 14 to move with respect to the ground without restraint by the actuator 18. Control device 34 controls the vertical movements of cutoff blade 24, and device 35 controls the vertical movements of blade 25.

Referring now to the control buttons, button 84 controls the master cutoff, the manipulation of which shuts off all hydraulic motors on the harvester. Button 85 controls the operation of hydraulic motor 79 concerned with the rotation of the conveyor belt 36, whereas control button 86 controls the rotation of the motors 29 utilized for driving the pickup belts.

Shown separately in FIG. 24 is the control 104 associated with actuator 78, which control, as previously mentioned, is not manipulated by the driver of the harvester. Manipulation of the control in one direction causes the moving belt to traverse toward the wagon 102 whereas movement in the opposite direction causes the moving belt to move toward the dashed line position shown in FIG. 22. By appropriate movements of control 104, the man concerned with loading the wagon is able to load it evenly.

Turning to FIG. 14 it will be noted that the view from this side of cab 81 reveals a storage drum 100, which serves as the reservoir for the hydraulic fluid utilized in the operation of the motors and actuators of my novel harvester. A comparatively large reservoir is employed inasmuch as considerable heating of the fluid takes place during use, and a comparatively large volume of fluid heats less rapidly than does a smaller volume. Also shown in this figure are the pipes and lines that are utilized in conducting fluid from the hydraulic pump to the control devices, and thereafter to the motors and actuators.

As will now be apparent to those skilled in the art, I have provided a novel harvester that achieves the rapid, highly satisfactory harvesting of crops such as celery, this being achieved at a minimum labor cost and with a minimum amount of the wastage that was prone to occur in the so-called automatic machines of the prior art.

Although I am obviously not to be limited to same, I prefer the use of a Diesel powered Crawler tractor as depicted in FIG. 1, with there being disposed thereon a pump for supplying sufficient quantities of hydraulic fluid for the operation of the various motors and actuators described hereinabove. For example, the pump may supply through appropriate high pressure lines 25 gallons of hydraulic fluid per minute at a pressure of 1000 p.s.i to 1800 p.s.i.

The various actuators used may be of a type manufactured by the Cross Company of Lewis, Kans. For example the actuators 26 used to position the cutoff blades may be actuator Model No. 1504–DA having a 1½ inch piston and a 4″ stroke whereas the actuator 18 used for positioning the framework 14 may be Model No. 218–DA.

The pickup belt arrangements may be powered by a motor 29 known as an Orbit motor. However, it will be apparent that the foregoing are cited by way of example only, and manifestly I am not to be limited thereto.

As to blades 24 and 25, I prefer these to be made of steel, to be welded to the members 23, to be of a length of approximately 24 inches, and to have a sweepback of approximately 38 degrees. Again, this information is cited by way of example and I am not to be limited thereto.

As is therefore to be seen, I have provided an improved automatic harvester utilizing at least one cutoff blade, and pickup means operatively associated with the cutoff blade. The pickup means is arranged to transport plants severed by the blade to substantially the uppermost portion of the harvester, with such pickup means preferably being disposed adjacent the driver of the harvester so that he can observe the manner in which the plants are being cut and then adjust as necessary the height of the blade on a moment-by-moment basis so as to insure that the roots are being properly eliminated. Receiving means are provided to receive the plants dropped from the pickup means and to transfer them to the edge of the harvester for loading purposes.

Other utilizations of my invention may appear obvious to those skilled in the art, and I therefore am not to be limited to the enclosed details except as required by the appended claims.

I claim:

1. A harvester for automatically harvesting edible plants that have been planted in rows comprising a framework, at least one cutoff blade supported from said framework for severing the edible portions of the plants from their root structures, pickup means at least partially supported by said framework and operatively associated with said cutoff blade, said pickup means being arranged to grasp the plants severed by said blade and transport the plants to substantially the uppermost portion of said harvester, means accommodating a driver on said harvester for the operation of same, said pickup means being disposed adjacent said driver accommodation means so that the driver can observe the manner in which plants are being cut from their root structures by said blade, means in said driver accommodation means for adjusting the height of said blade so that the driver can on a moment-by-moment basis make heightwise corrections of the position of said blade, thus to insure that the plants are being cut neither too high nor too low, and receiving means disposed under said pickup means for receiving the plants from the top of said pickup means and transferring them to a location from which they can be loaded substantially by gravity means into an accompanying wagon or the like.

2. The harvester as defined in claim 1 in which cutoff means are provided adjacent an upper portion of said pickup means so that only the main body of the plants will drop onto said receiving means, with the leaf portions of the plants being carried beyond said receiving means by said pickup means and thereafter discarded.

3. A harvester designed to travel along a row of plants and automatically harvest each plant therein, comprising a ground supported floating framework, a cutoff blade mounted on said framework and arranged to sever the plants at the correct location relative to the surface of the ground as said harvester moves thereover, the vertical repositioning of said framework as the ground contour changes thus bringing an appropriate repositioning of said cutoff blade without intervention of the harvester operator, upwardly inclined pickup means having one end mounted on said framework and disposed adjacent said cutoff blade so as to grasp the upper portion of each plant as it is cut adjacent its root portion by said cutoff blade and to convey it upwardly and rearwardly toward the upper end of said pickup means, and topping means mounted on said pickup means adjacent said upper end and depending therebelow so as to cut the plants being carried by said pickup means such that the separated portions will fall by gravity whereas the upper portions which are still being grasped by said pickup means are moved further rearwardly, released and discarded.

4. The device of claim 3 wherein receiving means are disposed below said topping means so as to receive the separated plant portions.

5. The device of claim 4 wherein said receiving means is a conveyor belt which is movable back and forth for even loading of the plant portions being carried thereby into a container, wagon, etc.

6. The device of claim 3 wherein means are provided between said cutoff blade and said framework to permit the adjustable positioning of said blade vertically relative to said framework.

7. The device of claim 6 having means thereon adjacent said pickup means for the operator of said harvester, such means being so located that the operator in control of said adjusting means on a moment-by-moment basis can correct the positioning of said cutoff blade relative to said framework so as to insure that the plants are being cut neither too high nor too low.

References Cited

UNITED STATES PATENTS

| | | | |
|---|---|---|---|
| 2,509,970 | 5/1950 | Edmonds | 56—30 |
| 2,867,068 | 1/1959 | Dumanowski | 56—15 |
| 3,031,828 | 5/1962 | Graham | 56—14 |
| 3,108,416 | 10/1963 | Bopf et al. | 56—14 |
| 3,335,553 | 8/1967 | Medd | 56—16 |
| 3,442,071 | 5/1969 | Duda | 56—327 |
| 975,586 | 11/1910 | Wadhams | 56—121.44 |
| 1,193,746 | 8/1916 | Winters | 171—61 |
| 1,748,745 | 2/1930 | Zuckerman | 56—25.4 |
| 2,522,308 | 9/1950 | Silva | 56—327 XR |
| 2,645,889 | 7/1953 | Warner | 171—62 XR |
| 2,791,076 | 5/1957 | Richardson | 171—61 R |
| 2,833,358 | 5/1958 | Lust | 171—37 |
| 2,855,058 | 10/1958 | Krier et al. | 171—61 XR |
| 3,168,145 | 2/1965 | Gunkel et al. | 171—61 |
| 3,262,503 | 7/1966 | Zijlstra et al. | 171—61 |

RUSSELL R. KINSEY, Primary Examiner

U.S. Cl. X.R.

56—121.46; 171—38, 61